Nov. 29, 1960 W. F. REA 2,961,698
PROCESS AND APPARATUS FOR PRODUCING FIBROUS MATS
Filed Sept. 17, 1956 2 Sheets-Sheet 2
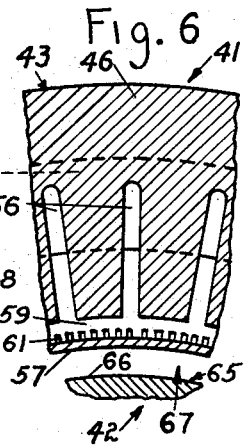
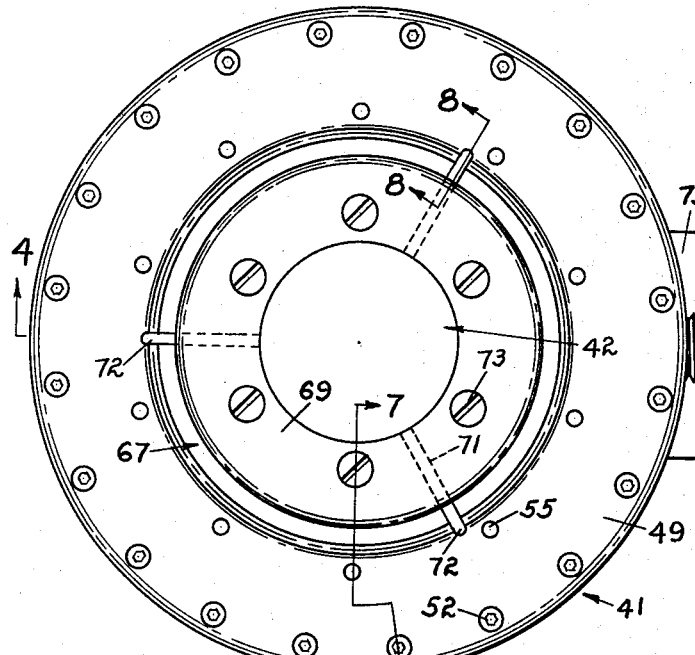
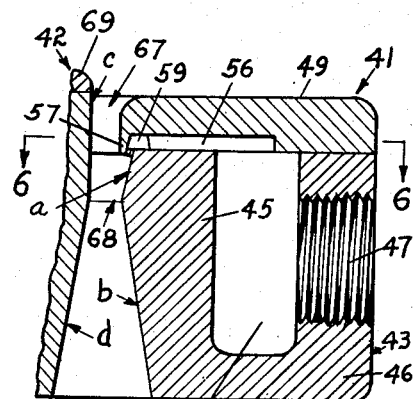
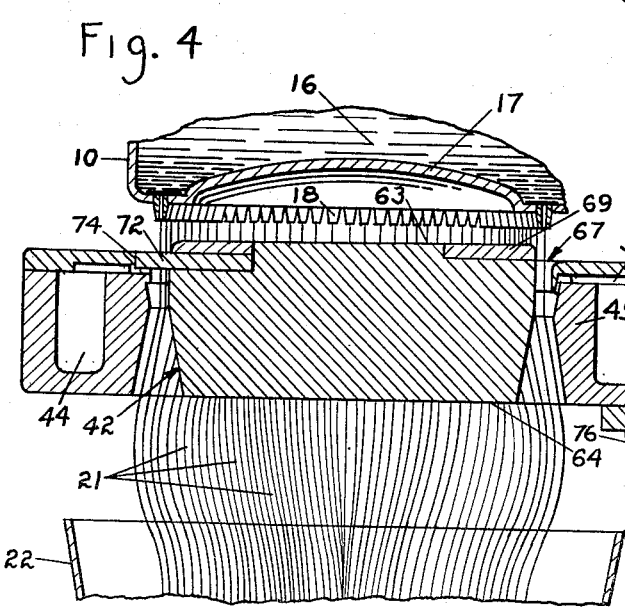
INVENTOR.
William F. Rea
BY
Nobbe & Swope
ATTORNEYS United States Patent Office 2,961,698
Patented Nov. 29, 1960

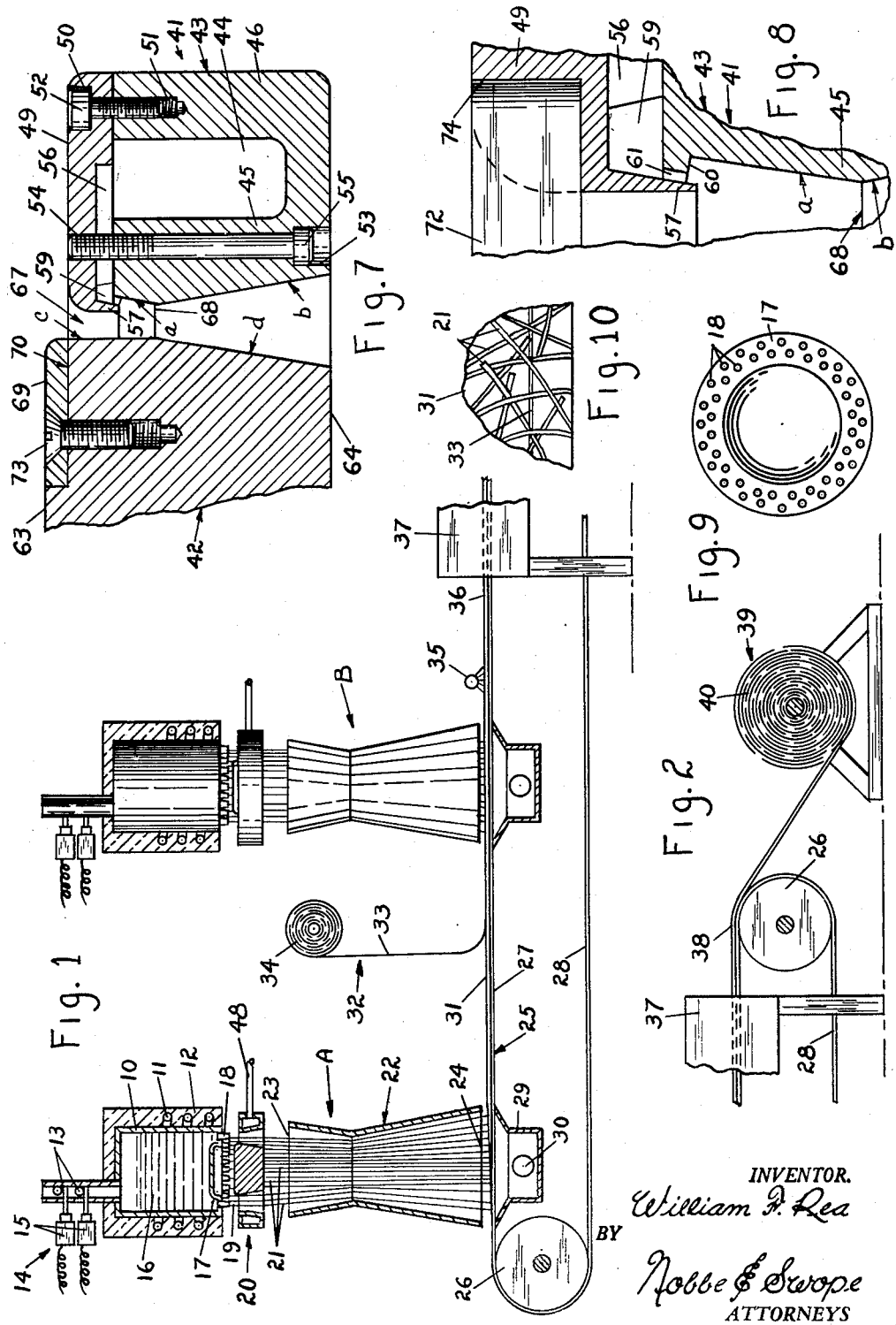

2,961,698

PROCESS AND APPARATUS FOR PRODUCING FIBROUS MATS

William F. Rea, Monroe County, Mich., assignor, by mesne assignments, to Johns-Manville Fiber Glass Inc., Cleveland, Ohio, a corporation of Delaware Filed Sept. 17, 1956, Ser. No. 610,227

8 Claims. (Cl. 18—2.5)

This invention relates generally to the production of fine fibers from heat-softenable materials and more particularly to an improved method and apparatus for producing fine blown glass fibers.

One process heretofore employed for the production of fine glass fibers comprised forming a body of molten glass in an elongated rectangular melting chamber. The melting chamber was formed of platinum or a platinum alloy and was provided with a plurality of apertures, formed in the rectangular base thereof in rectilinear alignment. Molten glass from within the melting chamber was allowed to flow downwardly by gravity through the aligned apertures as small molten streams. The molten streams passed downwardly between a pair of elongated gas manifolds or blower heads, positioned in parallel horizontal alignment with respect to each other, and supported immediately beneath the base of the melting chamber to act on the molten streams before they became solidified. The manifolds were adapted to create coacting high velocity jets or gas which impinged downwardly against the molten glass streams to grasp the streams and attenuate them into fine glass fibers.

However, the prior process suffered the economic disadvantages of requiring large amounts of energy per pound of fiber produced and also required large amounts of rare metals for fabricating the glass melting chambers.

It is therefore an important object of this invention to provide a novel process of and apparatus for the production of fine fibers from heat-softenable materials.

Another object is to provide a more efficient process of and apparatus for producing fine glass fibers from molten streams of glass.

Another object is to provide novel means for attenuating small streams of heat-softenable materials into extremely fine fibers, such as glass fibers.

A further object is to provide improved blower means for attenuating molten streams of glass to produce fine glass fibers.

Other objects and advantages of the invention will become more apparent during the course of the following description when taken in connection with the accompanying drawings.

In the drawings wherein like numerals are employed to designate like parts throughout the same:

Figs. 1 and 2 schematically depict an apparatus for manufacturing mats from glass fibers, constructed in accordance with the invention;

Fig. 3 is a plan view of the blower employed in the apparatus of Fig. 1;

Fig. 4 is a cross-section of the blower taken on the line 4—4 of Fig. 3;

Fig. 5 is a fragmentary section of the blower taken on the center line which extends through the attenuating gas inlet;

Fig. 6 is a fragmentary section taken on the line 6—6 of Fig. 5;

Fig. 7 is a fragmentary section taken on the line 7—7 of Fig. 3;

Fig. 8 is an enlarged fragmentary section taken on line 8—8 of Fig. 3;

Fig. 9 is a bottom plan view of a glass melting chamber typical of those employed in Fig. 1; and Fig. 10 is an enlarged fragmentary plan view of a mat produced in accordance with the present invention.

As shown in Fig. 1, the numeral 10 represents a glass melting chamber for melting glass forming materials fed thereinto. The melting chamber is of cylindrical configuration and is adapted to be heated by an electrically energizable coil 11 positioned in surrounding relationship thereto. The coil is embedded in a layer of insulating material 12, placed around the melting chamber to minimize loss of heat therefrom.

Glass forming materials in the form of marbles 13 are gravitationally metered into the melting chamber 10 from a suitable bulk supply by means of a feed unit 14. The feed unit suitably comprises a pair of vertically aligned and spaced solenoids 15 which are adapted to be alternately actuated to pass marbles individually into the melting chamber. Once within the melting chamber the marbles 13 are heated and reduced to a body of molten glass 16 by heat supplied to the melting chamber 10 from the heating coil 11.

The bottom 17 of the melting chamber 10 is provided with a plurality of small diameter orifices 18. The orifices are arranged in circular array adjacent the periphery of the bottom 17. Molten glass formed within the melting chamber 10 exudes by gravity through the orifices 18 in the form of small diameter molten streams 19 which pass downwardly through the circular blower 20 of the present invention, positioned immediately beneath the bottom of the melting chamber and in proper alignment with the streams of molten glass exuded therefrom. The blower 20 is effective to attenuate the molten streams 19 to fibers 21 of very small diameter. The blower will be described in greater detail hereinbelow.

A hollow fiber directing hood 22 of generally cylindrical configuration, is positioned vertically beneath the blower 20 in fiber receiving relation thereto. The hood is provided with a fiber inlet opening 23 and a fiber outlet opening 24. The inlet opening and outlet openings are in vertical coaxial alignment, with the inlet opening positioned in fiber receiving relation beneath the blower 20. The hood 22 is effective to direct the fibers 21 and their entraining gas stream downwardly to a foraminous fiber collecting belt 25. The belt is of continuous configuration and is movably supported on a pair of horizontally aligned rollers 26. The belt is positioned so that the fiber collecting flight 27 as well as the return flight 28 operate in horizontal planes. The upper fiber collecting flight is positioned for movement immediately beneath the fiber outlet opening 24 of the fiber directing hood 22.

A vacuum chamber 29 is positioned adjacent the underneath side of the fiber collecting flight 27 of the belt 25 and is vertically axially aligned with the fiber outlet opening 24 of the fiber directing hood 22. The vacuum chamber 29 is provided with an outlet opening 30 which is connected by a suitable conduit to a vacuum pump such as a blower. The vacuum chamber is adapted to create a sub-atmospheric pressure condition adjacent the surface of the fiber collecting flight 27 of the belt 25 and thereby pull the gases entraining the fine fibers 21 through the belt 25. However, the belt obstructs the flow of fibers and collects them as a thin mat 31 on top of the fiber collecting flight 27. As the glass fibers hit the collecting surface of the conveyor they are broken into fibers of relatively shorter length and these fibers are collected upon the conveyor in the form of a relatively thin mat. The manner in which the fibers lie upon each other in interlaced, jackstraw fashion in the mat is shown in the plan view of Fig. 9.

The rate at which the fiber collecting flight 27 of the belt 25 is moved beneath the fiber directing hood 22, coupled with the rate at which fibers 21 are produced by the blower 20 will determine the thickness of mat 31 to be built up on the collection surface of the belt. By co-ordinating the speed of the belt and the rate of fiber production, mats of varying thickness can be produced.

In some instances it will be desirable to employ more than one fiber forming unit as above described, and shown in position in Fig. 1 by the letter A, to provide a more versatile process for producing different types of products. Accordingly, a unit identical with that described as occupying the A position can be positioned above the belt 25 in spaced relation from the A unit and adapted for use in series with the A unit. Such unit is marked B in Fig. 1.

When operating with A and B units as above described, a suitable reinforcement material can be applied to the mat between the A and B units. Thus, unit A is effective to form a lowermost or bottom mat layer and then a reinforcement medium is laid thereon, followed by the formation of a top layer to provide a composite material. The reinforcement material 32 may consist of spaced parallel continuous strands 33 which may be supplied from a roll or rolls 34 or in any other desired manner and are caused to be laid down on top of the lower mat layer formed by the A fiber unit. The reinforcement is payed out at a speed synchronized with the speed of the fiber collecting belt.

A suitable binder is applied to the mat such as by a spray means 35 positioned above the fiber collecting surface 27 of the belt 25 and is adapted to apply a light coating of a binder such as an aqueous suspension of a phenol formaldehyde thermosetting resin to the composite mat 36.

Following the binder application, the coated mat 36 is conveyed forwardly into an oven 37 where heat is applied to the mat and the binder contained thereon to cure the binder to a hard solid state and thus bind the fibers into an integral mat unit 38. Upon emergence from the oven, the bonded mat 38 is led to a wind-up section 39 where it is formed into a roll 40 for convenience in further handling and shipment.

The blower 20 of the present invention is illustrated in detail in Figs. 3 to 8 inclusive, and is comprised of two essential parts, namely an annular manifold 41 and a core unit 42 positioned within the manifold. As shown in Figs. 3 and 4 the manifold 41 is comprised of an annular body portion 43 of generally square section, having a U-shaped gas channel 44 formed therein. The gas channel is positioned centrally between the inner and outer walls 45 and 46 of the body portion and opens upwardly. A gas inlet port 47 is provided at a random point in the outer wall 46 and is threaded for the receipt of the threaded end of a gas conduit 48. Thus gas conveyed by the conduit is admitted into the U-shaped channel 44 for distribution around the body portion 43.

As further shown in Figs. 3 and 4, the body portion of the manifold is fitted with an annular but disc-shaped cover 49. As shown in Figs. 3 and 7 the cover is provided with a plurality of apertures 50 which mate with threaded apertures 51 provided in the body portion 43 for the receipt of bolts 52 to securely position and maintain the cover 49 in gas tight relation on top of the body portion 43. Additionally as shown in Fig. 7, holes 53 are provided in the body portion 43 which mate with threaded apertures 54 in the cover 49 for the receipt of bolts 55 to further secure the cover to the body.

As best shown in Figs. 5 and 6 the underside of the cover is provided with a series of spaced, radially extending grooves 56 which, when the cover is in position on the body portion 43 are adapted to convey gas introduced into the U-shaped chamber 44 inwardly toward the inside wall 45 of the body portion 43. The cover is also provided with a lip 57 on its inner periphery which extends downwardly and overlaps the upper portion $a$ of the inner wall 45 of the body portion 43.

Provided immediately behind the lip 57, is a circular groove 59 of inverted generally U-shaped section which extends around the inner periphery of the cover 49. This circular groove 59 connects with each of the aforementioned radially extending grooves 56 for uniform distribution of gas around the inner periphery of the cover.

As best shown in Fig. 8, at the top of the inner wall 45 of the body portion 43 of the manifold 41, there is provided an inwardly projecting lip 60 over which the downwardly projecting lip 57 of the cover 49 is adapted to fit. On the inner periphery of the lip 60 of the body 43 there is provided a plurality of vertically extending grooves 61 through which gas from the circular groove 59 is adapted to be ejected in a downward direction. Thus the annular manifold 41 when supplied with gas from the conduit 48, causes the gas to pass through the U-shaped channel 44 and the radially extending grooves 56, thence to the circular groove 59 and through the grooves 61 of the lip 57 for distribution in circular array, and issue downwardly along the inside wall 45 of the body portion 43 as a multiplicity of high velocity gas streams.

As best shown in Fig. 5, the upper portion $a$ of the inner wall 45 of the body portion 43 of the annular manifold 41 extends vertically downwardly at a slight inward angle for about ¼ of the distance between the top and bottom surfaces of the body portion. Thence the wall angles outwardly and downwardly as at $b$ for about ¾ of the thickness of the body portion. The core 42, which is of generally cylindrical configuration is supported in carefully aligned relationship within the circular opening provided by the annular manifold 41.

The core element 42 is of generally cylindrical configuration and is of slightly greater total thickness than the manifold 41, to allow for support elements, to be later described. The core 42 is provided with generally horizontally disposed upper and lower surfaces 63 and 64 connected by a circular outer wall 65. The upper portion $c$ of the wall 65 is vertically disposed and thus is of cylindrical configuration. However, at a point corresponding to the smallest diameter of the body member 43 of the annular manifold 41, the outer circular wall 65 of the core member 42 slants vertically downwardly and inwardly at a diverging angle from a centerline passing vertically between the core and manifold as at $d$, equivalent to the angle of divergence of the lower inside wall $b$ of the manifold from such centerline. Thus an annular space 67 is provided around the periphery of the core member 42 between such periphery and the inner wall 45 of the manifold 41, to provide a venturi-type opening as shown by the section views of Figs. 5 and 7. Gas injected through the narrow throat area 68 between the core and body member reduces atmospheric pressure at that point, to cause additional air to be drawn through the opening 67 and be carried forwardly with the ejected gas from the slots 61.

As shown in Fig. 7 a disc-shaped ring 69 is positioned within a groove 70 formed around the top of the core member 42. Three radially extending grooves 71 are formed in the bottom of the groove 70, and into the grooves 71 are fitted elongated rectangular support bars 72 which are securely held in position by attachment of the ring 69 to the core 42 through the medium of the screws 73. The support bars 72 extend across the opening 67 between the core 42 and the manifold 41 and their outer ends rest in grooves 74 provided in the cover 49 of the manifold as shown in Figs. 4 and 8. Thus the core is centrally positioned within the inner periphery of the manifold in uniform spaced relation from the inner wall of the manifold to provide a passage of uniform vertical sectional configuration between the outer periphery of the core 42 and the inner periphery of the manifold 41.

As shown in Fig. 4 the blower 20 is adapted to be positioned immediately beneath the apertures 18 provided in the bottom 17 of the melting chamber 10. To support the blower, an arm 75, having its one end connected to a suitable frame element, is provided at its other end with a securing means such as a bolt 76 threaded upwardly into the bottom surface of the body portion 43 of the manifold 41.

As shown in Figs. 1, 4 and 9, the circular array of apertures 18 provided in the bottom 17 of the glass melting chamber 10 and the annular space 67 provided by the core and manifold are positioned in vertically aligned relation. Thus the molten streams 19 exuding downwardly from the glass melting chamber 10 pass in spaced relation between the outer wall of the core and the inner wall of the manifold. As mentioned above, the slots 61 formed in the lip 60 of the body 43 of the manifold 41 provide a plurality of high velocity jets of gas which issue vertically downwardly to impinge against and grasp the molten streams of glass 19. By virtue of the venturi effect of the annular opening 67 between the core and the body member, the injected gas causes large amounts of occluded air to pass through the annular venturi-shaped opening. Thus a gas stream of great velocity and volume is provided which is effective to draw out or attenuate the molten glass streams of glass into fibers of small diameter.

Both the occluded and compressed gas generated by the manifold are effective to cool the core and manifold and remove the heat imparted thereto by radiation from the bottom of the melting chamber and the molten streams of glass passing therethrough.

As shown in Fig. 4 the fibers passing downwardly through the manifold and core unit have a tendency to balloon outwardly as they pass immediately beneath the bottom surface of the core 64 and the manifold 41. The reason for this ballooning effect is not exactly known, but it may be due to a backdraft of air caused by the flat bottom surface of the core member. This effect while not exactly explainable provides an advantage in keeping the fibers out of contact with either the lower portion of the outer wall of the core or the lower portion of the inner wall of the body portion of the manifold and thus prevents the fibers from wearing such surfaces as would otherwise be the case if contact were made.

Materials applicable for use in the fabrication of the blower of the present invention are not to be restricted. However, for illustrative purposes it may be mentioned that heat resisting materials are desired which include aluminum, stainless steel or other oxidation resistant metals. Also, in some instances the blower may be fabricated from refractories such as porcelain, alumina and the like. The primary requisite being that the body and cover of the manifold be capable of withstanding a gas pressure suitable for fiber attenuation.

While it is not desired to limit the scope of the present invention, it has been found satisfactory to operate the present blower at a gas pressure of between about 40 and 100 pounds p.s.i.g. However, pressures outside of this range are to be included within the scope of the invention.

A number of advantages accrue from the present invention over the prior process using opposed rectilinear manifolds and a rectangular melting chamber as discussed hereinbefore. The rectangular melting chamber, provided at its base with a plurality of aligned molten glass metering orifices, requires substantially more precious metal per orifice than is required in the cylindrical melting chamber employed in the present invention. In fact it has been found, in actual practice, that only 30% of the amount of precious metal is required to fabricate a cylindrical melting chamber as is required for the fabrication of a rectangular chamber of equivalent capacity. Since expensive platinum alloys are most suitably employed for fabricating the melting chamber, it will be apparent that a substantially lower investment per fiber forming orifice is effected by employing a cylindrical melting chamber and blower in accordance with the present invention.

Also, as mentioned hereinbefore, the prior process utilized opposing manifolds, i.e., two manifolds were employed. In accordance with the principle of the present invention only one manifold is employed, taking advantage of a venturi-type air passage formed by positioning the manifold in cooperative relation with a core or opposing member having a cooperative aerodynamic surface. Thus it will be seen that the amount of energy in the form of attenuating gas is at the outset reduced substantially.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:
1. A blower for attenuating molten streams of glass into fine fibers comprising, an annular manifold having a gas passage therein and an inner periphery, a plurality of gas feeding orifices formed on said inner periphery, means for introducing a gas under pressure to said gas feeding orifices, a core positioned within said annular manifold, said core having an outer periphery positioned in gas conducting relation with the inner periphery of said manifold and defining an annular gas passage with the inner periphery of said manifold.

2. A blower for attenuating molten streams of glass into fine fibers comprising, an annular manifold having a gas passage therein and an inner periphery, a plurality of gas feeding orifices formed on said inner periphery, means for introducing a gas under pressure to said gas feeding orifices, a core positioned within said annular manifold, said core having an outer periphery positioned in gas conducting relation with the inner periphery of said manifold and defining an annular gas passage with said manifold, said orifices of said manifold being adapted to eject streams of gas monodirectionally through said annular gas passage between said core and said manifold, whereby molten streams of glass introduced into said annular gas passage are attenuated to fine fibers.

3. Apparatus for producing glass fiber mats comprising, a heated container for forming a body of molten glass, means for withdrawing a plurality of molten streams from said container in a circular array, a blower positioned adjacent said container for attenuating said molten streams to fine fibers, including an annular manifold provided with a gas passage and a bounding aerodynamic surface, a gas outlet orifice formed on said bounding surface and connected to said gas passage in gas conducting relation, means for introducing a gas under pressure to said gas passage, a circular aerodynamic surface of continuous and uninterrupted profile positioned in spaced, gas conducting relation to said bounding surface and forming a venturi-type passage with said bounding surface, means for directing the fibers produced by said blower, and means for collecting said fibers from said fiber directing means as a random mat.

4. Apparatus for forming glass fibers comprising, a melting chamber having a wall provided with a plurality of orifices arranged in circular array, a blower positioned adjacent said wall, said blower including a manifold and a circular core member, said core member being positioned within said circular array of orifices and the manifold outside of said circular array of orificies, the outer peripheral surface of said core and the inner peripheral surface of said manifold forming an annular gas passage directed away from said wall, said annular passage being positioned in alignment with said circular array of orifices, and means for introducing a gas under pressure into said annular passage.

5. Apparatus for forming glass fibers as defined in claim 4, wherein the surfaces of the core and manifold spaced farthest from and substantially parallel to said wall are substantially in planar alignment.

6. Apparatus for forming glass fibers comprising, a melting chamber having a wall provided with a plurality of orifices arranged in a circular array, a blower positioned adjacent said wall, said blower including a manifold and a circular core member, said core member being positioned within said circular array of orifices and the manifold outside of said circular array of orifices, the outer peripheral surface of said core and the inner peripheral surface of said manifold forming an annular gas passage directed away from said wall, said annular passage being positioned in alignment with said circular array of orifices, means for introducing a gas under pressure into said annular passage, and means for maintaining said formed glass fibers out of contact with the peripheral surfaces defining said annular gas passage.

7. Apparatus for forming glass fibers comprising, a melting chamber having a wall provided with a plurality of orifices arranged in circular array, a blower positioned adjacent said wall, said blower including a manifold and a circular core member, said core member being positioned within said circular array of orifices and the manifold outside of said circular array of orifices, the outer peripheral surface of said core and the inner peripheral surface of said manifold forming an annular gas passage directed away from said wall, said annular passage being positioned in alignment with said circular array of orifices, means for introducing a gas under pressure into said annular passage, and means for causing the attenuated fibers to balloon outwardly as they pass the extremities of said peripheral surfaces farthest from said wall.

8. The process of producing a glass fiber mat comprising, establishing a molten body of glass, withdrawing a plurality of streams of molten glass arranged in a circular array from said molten body of glass, directing said plurality of streams while in circular array in a downward direction between a pair of spaced annular coacting aerodynamic surfaces of continuous and uninterrupted profile, introducing a high velocity fluid stream moving in the same general direction as said plurality of streams of molten glass and between said aerodynamic surfaces to attenuate said streams of molten glass into fine fibers, directing said fibers against a fiber collecting surface, and collecting said fibers as a mat on said surface.

References Cited in the file of this patent

UNITED STATES PATENTS

| | | |
|---|---|---|
| 238,227 | Kennedy et al. | Oct. 13, 1885 |
| 2,121,802 | Kleist et al. | June 28, 1938 |
| 2,133,235 | Slayter | Oct. 11, 1938 |
| 2,189,822 | Thomas et al. | Feb. 13, 1940 |
| 2,206,060 | Slayter | July 2, 1940 |
| 2,224,466 | Baker et al. | Dec. 10, 1940 |
| 2,511,381 | Stevens | June 13, 1950 |
| 2,515,738 | Slayter et al. | July 18, 1950 |
| 2,565,941 | Barnard | Aug. 28, 1951 |
| 2,622,306 | Anderson | Dec. 23, 1952 |
| 2,624,912 | Heymes et al. | Jan. 13, 1953 |
| 2,699,415 | Nachtman | Jan. 11, 1955 |
| 2,728,699 | Labino | Dec. 27, 1955 |

FOREIGN PATENTS

| | | |
|---|---|---|
| 498,707 | Great Britain | Jan. 12, 1939 |
| 129,507 | Australia | Oct. 18, 1948 |
| 766,315 | Germany | Aug. 9, 1951 |
| 724,314 | Great Britain | Feb. 16, 1955 |
| 1,117,767 | France | Mar. 5, 1956 |